Patented Sept. 30, 1947

2,428,187

UNITED STATES PATENT OFFICE 2,428,187

METHOD OF INHIBITING ATTACK ON GLASS SURFACES BY CAUSTIC SODA SOLUTIONS

Walter F. Wegst and Perle N. Burkard, Wyandotte, Mich., assignors to Wyandotte Chemicals Corporation, Wyandotte, Mich., a corporation of Michigan No Drawing. Application August 26, 1943, Serial No. 500,146

3 Claims. (Cl. 252—156)

The present invention relates to a process for the protection of glass or glazed surfaces, such as those of milk or beverage bottles and similar glass containers and of affixed ceramic glazed labels, during the washing thereof. While described with particular reference to the cleansing of bottles and the like as aforesaid, protective action is similarly available in general in the cleansing by alkaline detergents of glazed or vitreous ceramic surfaces, such as those of mixing kettles, holding vessels, pasteurizers, etc., widely used in the food industries, where the efficient germicidal and cleansing action of strong alkalis would be desirable but for their corrosive action.

It is the common practice in the bottling of dairy products and a variety of beverages to refill and re-use the glass bottles many times over, during their normal life. When such bottles are returned to the bottler after being emptied by the consumer, it is highly important that they be subjected to a vigorous and thorough washing, not only to remove residues, dirt and soil and similar contamination and thus to render them physically clean, but also to subject them to a germicidal action in order to render them sterile and free from bacterial or fungal contamination. Washing solutions of relatively high alkaline strength have been found most suitable in practice for a washing operation of this nature. Caustic alkali, e. g., sodium hydroxide, is the major ingredient of most such alkali washing solutions. In fact, several state laws require a minimum NaOH content in the bottle washing solutions employed by bottling plant operators.

It has been found, however, that the glass surfaces of bottles which are subjected to such alkali washing solutions, particularly under conditions of commercial operation where the solution is heated and the bottles handled in a mechanical washing machine, are subject to alkali attack. This attack manifests itself by accentuating the scratched, scuffed, etched or worn appearance of the glass surface, which effect is commonly initiated by mechanical abrasion. "Scuffing" is a term popularly used in the art to describe the pitting, nicking, scratching, wear and general defacement resulting on the glass surfaces through the combined forces of destructive action, such as mechanical abrasion, chemical corrosion, solubility and weathering, to which the glass container is normally subjected. Since largely initiated by mechanical abrasions, the evidences of scuffing are mainly to be found at raised letters, bulges or other contact points, where the effects and appearance may be quite similar to that which might be produced by rough grinding. It has been definitely established that even though scuffing is generally initiated by ordinary physical contact of glass-to-glass or metal-to-glass surfaces, the effects may be increased and encouraged by alkali attack.

Applied color labels are especially subject to abrasion since due to their mode of application they provide a surface slightly raised above the glass background. These labels usually consist of glass frits which are fused in place after formation of the parent article. The effects of abrasion and/or solution of vitreous applied color labels are made particularly evident by loss of luster, dulling, thinning, scratching, peeling and crocking, or in general the more rapid development of scuffing action. Under severe exposure, labels may soften and crock, resulting in rapid loss of colored pigments and display value. In some instances, these labels are applied as a succession of incomplete coatings of contrasting colors for purposes of working out color designs. The deterioration of such over-lays results in exposure of underlying colors which is particularly unsatisfactory.

Furthermore, scuffing results in a weakening of the strength of glass bottles, rendering them more liable to breakage and even explosion after filling and crowning in the case of pressure retaining vessels such as carbonated beverage bottles. The latter hazard of course is very material from the standpoint of human safety.

In addition, the maintenance of the new and attractive appearance of the glass bottle is of economic importance to the bottling plant operator, since a large portion of his investment is in his stock of bottles. The bottling plant operator therefore finds it highly desirable to keep his bottles free from scuffing, scaling and etching so that they will be not only commercially acceptable to his customers, but also safe for human use and handling.

The present invention relates to the addition of an organic compound whereby the aqueous alkali washing solution can be used without impairing its detergent or germicidal value, but the glass surfaces undergoing cleaning are protected against attack and deterioration from the alkali. We have discovered that tannins and chemically related compounds containing at least three hydroxy groups each on adjacent benzenoid carbon atoms have positive effect. These types of compounds exert a large measure of protective action on glass and vitreous ceramic surfaces against alkali attack and the coincidence of scuffing, scaling and etching. The simplest member, pyrogallol, is especially effective and successful in accomplishing the result. Such polyphenolic compounds as catechol, resorcinol, hydroquinone, hydroxy-hydroquinone, phloroglucinol and picric acid are ineffective. Several of the tannins give more favorable results than tannic acid. Extracts of tea as a source of tannin proved to be good, as is borne out by the results found in Table III. Other vegetable tannin-containing materials are suitable. The tannins and related materials are more effective on a weight for weight basis than various inorganic materials which have been suggested for a similar purpose. In the use of the term tannins we mean to include all forms, such as crude, refined, extracts and concentrates, for example.

We have found that alkali solutions containing small amounts of tannin or related compounds therein, dissolve far lesser amounts of glass from bottles or other glass containers than are dissolved by like alkali solutions in water of equal concentration. The presence of inorganic water-soluble phosphates, even as low as 4% on a solids basis, severely depreciate protective action conferred by tannins and these related compounds. Water-soluble silicates likewise are detrimental. These tendencies can be corrected to a degree by increasing the proportion of tannin in the solute, as Table II reveals. Carbonates of the alkali metals apparently have no effect. These results are set out in Tables I and II herein respectively. Zincates, disclosed in joint patent application Ser. No. 425,804 of which one of the applicants is an applicant in the present invention, are compatible with tannin in NaOH solutions with respect to antiscuffing action on glass. Highly colored solutions are formed attributable to the tannin addition, but it has been found that the color disappears on rinsing the receptacle before the last trace of alkali has gone.

When glass bottles or beverage containers are returned to the bottling plant for washing prior to re-filling, they are ordinarily passed through either soaker type or hydraulic type washing machines. In a large machine of the soaker type a typical cycle of operations would consist in the following:

Pre-rinse with warm water.
Soak at 140° F. in alkaline solution of 3.0–3.5% caustic soda content.
Soak at 155° F. in alkaline solution of 2.5–3.0% caustic soda content.
Water rinse at lower temperature, at 125° F.
Water rinse at lower temperature, at 95° F.
Internal and external brushing.
One or more internal and external cool water rinses.
Internal chlorination rinse.

In practice the number and sequence of cleansing steps is subject to considerable variation, however, and this is true also of temperatures and concentrations of solutions employed. The step of chlorination is most commonly employed in the washing of dairy bottles.

The practicable ranges of temperature and concentration for the alkaline solutions are usually taken to be 120–165° F. and 1–5% caustic respectively, as hereinafter defined. The effects of soaking time, alkali concentration and temperature are inter-related in the sense that increased temperatures and/or concentrations diminish the soaking period required to attain a given standard of cleansing and germicidal performance. It is known further that increases in temperature of the alkali solutions are reflected in increased scuffing action and it is generally true that within the practicable economic limits increased concentrations are reflected in increased attack on the glass substance and scuffing action. The period of exposure of bottles to the detergent solutions will usually run upward of 5 minutes per cleansing operation using soaker type machines.

Hydraulic type machines operate on the principle of projecting streams of alkaline solution and rinse waters at high velocity upon the bottles internally and externally rather than passage of bottles through soaker tanks. Due to the vigorous mechanical action the practicable concentrations of and exposures to strongly alkaline solutions may run somewhat lower than for soaker type machines.

In either type machines, the alkali content of the washing solutions is maintained by suitable additions (make-up) from time to time. Control in the field may be exercised through indicating meters or by simplified chemical test methods. One common basis for controlling alkali concentration is the determination of actual caustic soda content, the practicable ranges of which may be taken to be 1–5%, dependent on other conditions hereinbefore referred to.

It has been determined that the alkali attack upon glass bottles during such a washing treatment is in the nature of a dissolution of the glass by the alkali, hence a determination of the weight loss of glass bottles subjected to the action of an alkali washing solution presents a reliable criterion for measuring the degree of such attack.

Tests were carried out in the following manner: New bottles of one of the largest soft drink companies after weighing were filled with 3% distilled water solutions of solute composed of 96 parts by weight NaOH and 4 parts by weight of the test material. These bottles were then held at 185° F. for six days, the contents then removed, the bottles thoroughly washed to remove all alkali, dried and re-weighed. The losses of weight in grams were tabulated. To arrive at a basic for comparison, two of the same type of bottles were tested under identical conditions using a pure 3% NaOH solution in distilled water. The loss of weight was 1.633 and 1.665 grams respectively on the blanks.

The results of the tests are set out in the following table.

Table I

| Inhibitor | Wt. Loss, Grams | Condition of Bottles | |
|---|---|---|---|
| | | Wet [1] | Dry [2] |
| None | 1.633 | Heavily Scaled | Slightly Etched. |
| Do | 1.665 | do | Do. |
| Pyrogallic Acid | 0.072 | No Scale | Clear. |
| Do | 0.128 | do | Do. |
| Divi Divi Extract | 0.077 | do | Do. |
| Wattle Bark Extracts | 0.106 | do | Do. |
| Quebracho (powdered) | 0.120 | do | Not Etched. |
| Do | 0.100 | do | Do. |
| Quebracho Crystals | 0.135 | do | Do. |
| Quebracho Extract | 0.157 | do | Clear. |
| Chestnut Extract | 0.296 | Medium Scale—very loose | Do. |
| Hemlock Liquid Extract | 0.629 | No Scale | Do. |
| Sumac Extract | 0.785 | Medium Scale—adherent | Heavily Etched. |
| Tannic Acid | 0.8+ | Fine Scale—all over | Finely Etched. |
| Gallic Acid | 1.015 | Slight Scale | Do. |

[1] Wet denotes observations made on bottles immediately upon taking from oven while still containing caustic solution.
[2] Dry denotes observations made upon bottles after heating and removal of caustic solution, rinsing with 6N HCl and drying.

In the above tests, regular commercial grades of tannin materials were used.

The effect of various addition agents to NaOH-tannin mixtures is shown in the following table:

scuffing of bottles under commercial operating conditions show that the relative degree of dissolution of glass observed in the washing caustic alkalies follows closely the same order as weight Table II

| Solute Composition, Per cent | | | Wt. Loss, Grams | Condition of Bottles | |
|---|---|---|---|---|---|
| NaOH | Tannin [1] | Other | | Wet | Dry |
| 86.4 | 4.0 QB | 9.6 Na$_2$CO$_3$ | 0.114 | Clear, No Scale | Excellent. |
| 86.4 | 4.0 QB | 9.6 Na$_3$PO$_4$ | 2.000 | Heavy Scale | Good; Slight Etching. |
| 86.4 | 4.0 QB | 9.6 Na$_2$SiO$_3$.5H$_2$O | 1.311 | Heavy Sediment | Excellent. |
| 86.4 | 4.0 PG | 9.6 Na$_2$CO$_3$ | 0.095 | Slight Precipitate | Fair. Cloudy; Etched. |
| 86.4 | 4.0 PG | 9.6 Na$_3$PO$_4$ | 2.057 | Heavy Scale | Poor. Cloudy; Etched. |
| 86.4 | 4.0 PG | 9.6 Na$_2$SiO$_3$.5H$_2$O | 0.750 | Moderate Sediment | Do. |
| 92.0 | 4.0 QB | 4.0 Na$_4$P$_2$O$_7$ | 1.010 | Heavy Scale | Good. |
| 92.0 | 4.0 QB | 4.0 Na$_6$P$_4$O$_{13}$ (Sodium Tetraphosphate) | 1.812 | do | Do. |

[1] QB—Quebracho, Powdered; PG—Pyrogallol.

It has thus been demonstrated that the weight loss from the alkali solution can be practically eliminated. Translated into terms of the industry, this means that bottles in commercial washing operations may be washed a greatly increased number of times than heretofore without displaying the detrimental effects of scuffing, scaling or etching.

The anti-scuffing action of tannins and chemically related compounds holds true in ranges other than 4% previously disclosed.

Furthermore the protection is not limited to NaOH solutions but extends to other caustic alkalies, although seldom encountered in commercial work. Nor is it limited to water solutions, but is applicable to aqueous solutions wherein water is the principal solvent component.

Field tests which we have conducted on the losses obtained by the foregoing solubility test method.

The effect of water extracts of tea as a source of tannin of different concentrations as an inhibitor was studied.

Tests in which water extracts of tea were employed as inhibitors were carried out as follows:

A strong extract was prepared by boiling dry tea with water for ½ hour followed by separation of the clear extract. Solutions containing caustic soda and tea extract of compositions indicated in Table III were tested for weight loss effects as described in column 4, with the results shown below:

Table III

| 200 ml. Detergent Solution Contained | | Wt. Loss, Grams | Condition of Bottles (final) | | Color of Solution |
|---|---|---|---|---|---|
| NaOH, Grams | Extract from Tea, Grams | | Wet | Dry | |
| 5.94 | 0.06 | 1.369 | Heavy Scale | Good | Pale Tea. |
| 5.88 | 0.12 | 0.116 | Light Scale | Excellent | Light Tea. |
| 5.76 | 0.24 | 0.108 | do | do | Tan. |
| 5.52 | 0.48 | 0.059 | do | do | Dark Brown. |

The effect of variation in the content of quebracho and pyrogallic acid in standard weight loss tests, wherein 3% total solute was employed for the duration of treatment of 6 days at 185° F., is shown in the following table:

Table IV

| Inhibitor, Dry Basis, Per cent | Wt. Loss, Grams | Original Solution, Appearance | Condition of Bottles (final) | |
|---|---|---|---|---|
| | | | Wet | Dry |
| 0.1 QB [1] | 1.210 | Clear, Weak Amber | Heavy Spotty Scale, easily loosened | Badly Etched. |
| 0.4 QB | 1.600 | Clear, Dark Amber | ...do... | Do. |
| 1.0 QB | 1.252 | ...do... | ...do... | Etched. |
| 2.5 QB | 0.392 | Clear, Color of "Coca Cola" | Scale less than 3 preceding | Slightly Etched. |
| 4.0 QB | 0.100 | ...do... | No Scale | Not Etched. |
| 0.1 PG [2] | 1.728 | Clear, Practically Colorless | Heavy Spotty Scale | Slightly Etched. |
| 0.4 PG | 1.057 | Clear, Light Amber | ...do... | Heavily Etched. |
| 1.0 PG | 0.085 | Clear, Darker Amber | No Scale | Clear, Not Etched. |
| 2.5 PG | 0.066 | ...do... | ...do... | Do. |
| 4.0 PG | 0.072 | Clear, Very Dark | ...do... | Do. |

[1] QB—Quebracho, Powdered, Commercial.
[2] PG—Pyrogallic Acid.

In the foregoing Tables III and IV, it will be seen that where the proportion of organic inhibitor such as the extract of tea (Table III), the pyrogallic acid and quebracho (Table IV) are present in the proportions of 1 to 4% by weight on the basis of the total caustic soda and organic inhibitor present, then the desired inhibiting action and protection against glass attack are obtained.

There may be admixed with the caustic and the tannin such washing assistants as sodium meta-silicate, -orthosilicate, -carbonate, -metaborate, and/or surface active agents, and in general such additional materials as may be appropriate to the composition of bottle washing alkalies in particular, but not limited thereto.

While the particular modes of treatment herein set out, as well as the treating compositions, are well adapted to carry out our invention, it is to be understood that the invention includes all such modifications and changes as may come within the scope of the appended claims.

We claim:

1. The method of inhibiting attack and dissolution of glass and ceramic surfaces by caustic soda solutions, which comprises subjecting such surfaces to contact with an aqueous solution of 1 to 5% by weight of caustic soda content, and incorporating therein on the basis of each 96 parts by weight of NaOH, 4 parts by weight of a material selected from the group consisting of tannic acid, gallic acid, pyrogallic acid and naturally occurring tannins.

2. The method of inhibiting attack and dissolution of glass and ceramic surfaces by caustic soda solutions, which comprises subjecting such surfaces to contact with an aqueous solution of 1 to 5% by weight of caustic soda content, and adding thereto an organic inhibiting material in the amount of 1 to 4% by weight on the basis of the total caustic soda and inhibiting material present, said material being selected from the group consisting of tannic acid, gallic acid, pyrogallic acid and naturally occurring tannins.

3. The method of inhibiting attack and dissolution of glass and ceramic surfaces by caustic soda solutions, which comprises subjecting such surfaces to contact with an aqueous solution of 1 to 5% by weight of caustic soda content, and adding pyrogallic acid thereto in the amount of 1 to 4% by weight of the total caustic soda and pyrogallic acid present.

WALTER F. WEGST.
PERLE N. BURKARD.

REFERENCES CITED

The following references are of record in the file of this patent:

UNITED STATES PATENTS

| Number | Name | Date |
|---|---|---|
| 1,628,163 | Lillejord | May 10, 1927 |
| 2,241,984 | Cooper | May 13, 1941 |
| 2,248,656 | Bird | July 8, 1941 |
| 2,297,670 | Schroeder et al. | Sept. 29, 1942 |
| 2,359,913 | Hill | Oct. 10, 1944 |

OTHER REFERENCES

Chemical Formulary, Bennett, volume 4 (1939), page 507.